US010629094B1

(12) United States Patent
Barker et al.

(10) Patent No.: US 10,629,094 B1
(45) Date of Patent: Apr. 21, 2020

(54) MODULAR TRAINING SYSTEM, ASSEMBLY AND METHOD OF USING SAME

(71) Applicant: Northeast Wisconsin Technical College, Green Bay, WI (US)

(72) Inventors: Joseph John Barker, Green Bay, WI (US); Edward Francis Kralovec, De Pere, WI (US); Troy A. Giese, New Franken, WI (US); Jacob D. Morois, Green Bay, WI (US)

(73) Assignee: Northeast Wisconsin Technical College, Green Bay, WI (US)

( * ) Notice: Subject to any disclaimer, the term of this patent is extended or adjusted under 35 U.S.C. 154(b) by 440 days.

(21) Appl. No.: 14/321,048

(22) Filed: Jul. 1, 2014

Related U.S. Application Data

(60) Provisional application No. 61/841,689, filed on Jul. 1, 2013.

(51) Int. Cl.
*G09B 23/18* (2006.01)

(52) U.S. Cl.
CPC .................. *G09B 23/183* (2013.01)

(58) Field of Classification Search
CPC ........ G09B 23/00; G09B 23/02; G09B 23/06; G09B 23/08; G09B 23/18; G09B 23/181; G09B 23/182; G09B 23/183; G09B 23/185–186
USPC ....................................... 434/350
See application file for complete search history.

(56) References Cited

U.S. PATENT DOCUMENTS

| | | | | |
|---|---|---|---|---|
| 3,510,963 A * | 5/1970 | Zbar et al. | ........... | G09B 23/185 361/767 |
| 4,606,725 A * | 8/1986 | Chio | ................... | G09B 23/186 434/224 |
| 4,623,312 A * | 11/1986 | Crawford | ............... | G09B 25/02 434/224 |
| 4,650,425 A * | 3/1987 | McGarry | ............... | G09B 25/02 248/639 |
| 4,776,798 A * | 10/1988 | Crawford | ............... | G09B 25/02 434/224 |
| 4,943,238 A | 7/1990 | Gregorio | | |
| 5,178,543 A | 1/1993 | Semans et al. | | |
| 5,372,508 A | 12/1994 | Hautzenroder | | |
| 5,562,454 A | 10/1996 | Kanzaki et al. | | |
| 5,868,575 A | 2/1999 | Kuczewski | | |
| 6,915,105 B2 | 7/2005 | Masuda | | |
| 7,160,113 B2 * | 1/2007 | McConnell | ............. | G09B 7/00 320/107 |
| 2002/0142269 A1 * | 10/2002 | Harriman | ............... | G09B 15/00 434/118 |

(Continued)

*Primary Examiner* — Timothy A Musselman
(74) *Attorney, Agent, or Firm* — Joseph S. Heino; Erin E. Kaprelian

(57) ABSTRACT

A module assembly includes a device. The device comprises a base structure and a flat planar top surface located at an upper portion of the base structure. The module assembly further includes an electrical source coupled to the base structure of the module to provide power to the device. A plurality of components is coupled to the device at the top surface. Each component of the plurality of components is coupled to the electrical source and the plurality of components combine to purpose a particular technical function. A module system comprises at least two module assemblies coupled together. The module system may purpose a combined technical function.

20 Claims, 9 Drawing Sheets

(56) References Cited

U.S. PATENT DOCUMENTS

2005/0209808 A1\* 9/2005 Kelbon .................. G01R 1/025
  702/117
2008/0254415 A1\* 10/2008 Barry .................... E02F 9/2008
  434/29

\* cited by examiner

MODULAR TRAINING SYSTEM, ASSEMBLY AND METHOD OF USING SAME

This Application claims the benefit of U.S. Provisional Application No. 61/841,689, filed Jul. 1, 2013.

FIELD OF THE INVENTION

The present invention relates generally to systems, assemblies and methods used with hands-on technical training. More particularly, it relates to a training system, assembly, and method that uses a plurality of transportable training modules, each such module being designed with a single individual training modules that are highly portable, uniformly storable, and easily accessible for student use. The training system, assembly, and method of the present invention also provides for individual training modules that are each designed with a singular technological function and that are further designed to be combined with other modules to create systems for advanced technological training functions.

BACKGROUND OF THE INVENTION

Hands-on training is necessary in the areas of technologies where, following their technical training, students will be expected to operate and trouble-shoot technical hardware of the type that is used in industrial applications. Most technologies today require sophisticated knowledge and skills training, particularly those relating to the mechanical, electrical and electro-mechanical arts where mechanical and electrical components are implemented to accomplish a particular functionality. Currently in the area of training in the electrical arts, students are expected to use oversized panels that contain a wide variety of "representative" components or theoretical renditions of components that simply replicate certain functionalities.

One problem with such panels is their size. They are not easily moved or even movable at all, which can hinder training. Another problem is that such panels include a wide variety of components, many of which are not commonly used in typical intended applications. Accordingly, such panels take up space, are not conducive to practical use and, most importantly DO not present a realistic representation of what the electrical and electronic hardware components will actually look like in the real world.

As a substitute for cumbersome training panels that are common in the prior art, students often are asked to create functional "mock-ups" of their own. This can lead to the creation of electrical circuits that are not easily traced to ensure that the intended functionality is met, that may require students to assemble components that are cannibalized and pieced together in a rather unorganized or unintentional way, and may take up substantially more desk-space or table-space than is available to the student, significantly inhibiting the accessibility and effectiveness of the learning experience.

It is therefore desirable to introduce students to the various components that will be used during their employment and to do so at an early stage in their training such that the student begins to recognize them in the classroom setting so as to be ready to and capable of recognizing them in the field. It is also desirable to teach students component functionality as well as providing them with structural recognition skills that will reinforce the students' understanding as to what a particular component does and what it looks like in the field. It is also desirable to provide students with a wide variety of different functionalities, those functionalities being dependent on the student's area of technical studies.

As a substitute for cumbersome training panels that are known in the prior art, students often are asked to create functional "mock-ups" of their own. This can lead to the creation of electrical circuits that are not easily traced to ensure that the intended functionality is met, that may require students to assemble components that are cannibalized and pieced together in a rather unorganized way (and not in a way that the components would normally be arranged or placed in the field due to any number of considerations such as the use of too many components or the creation of unwanted heat, undesirable electromagnetic fields and electrical hazards, to name a few), and may take up substantially more desk-space or table-space than is available to the student.

In the experience of these inventors, there is a clear need to provide a training system that utilizes a plurality of pre-designed modules that are, individually, of the same size but each designed with a singular technological function, and collectively are designed to be combined with other modules to create integrated systems for advanced technological functions. There is also a need to provide such a system where the modules are highly portable, uniformly storable, and easily accessible for student use and training.

SUMMARY OF THE INVENTION

In accordance with the foregoing, the present invention provides a training system, assembly and method that utilizes a plurality of pre-designed modules that are individually each designed with a singular technological function, and collectively are designed to be combined with other modules to create integrated systems for advanced technological functions. Each module is, individually, the same size as other modules in the system and assembly, providing for modules that are highly portable, uniformly storable, and easily accessible for student use and training.

The modules in accordance with the present invention are all constructed on the same size base mounting panels, which fit on designed carts for storage and mobility. The modules can be placed as needed at workstations and then returned to the storage carts at the conclusion of the training session. The mobile storage carts are designed to fit through standard commercial doorways and elevators, and are easily transportable promoting ease of mobility. Further, all modules are designed to require readily available 120 VAC power, promoting accessibility to deliver training in virtually any environment. The modules in accordance with the present invention provide a practical learning experience in that all are designed with "industry-recognized" components and constructed to "industry-recognized" standards. In some examples, the "industry-recognized" components may be International Electrotechnical Commission (IEC) Recognized components. The training modules include intentionally designed access to wiring and connection of components, aligning with the requirements of the associated included curriculum to facilitate deliberate training outcomes for the learner.

The modules in accordance with the present invention can be stored on movable storage carts. The modules can be placed as needed at work stations and then returned to the storage carts. Further, it is desirable that the modules be like-configured and incorporate components that would be used and encountered in the engineering and technology training arts, as well as in the medical arts, the dental arts or in virtually any educational or training setting where real-life equipment and equipment components would or could be used by students following training.

The foregoing and other features of the system, assembly and method of the present invention will be apparent from the detailed description that follows.

DETAILED DESCRIPTION OF THE INVENTION

Figure 1:
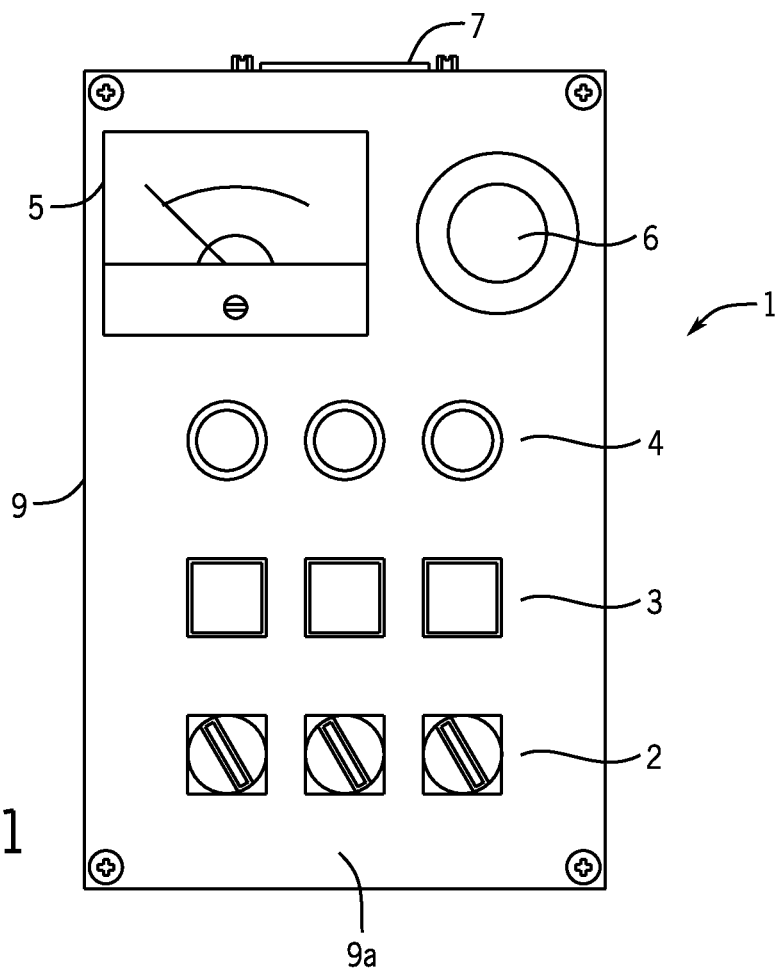
FIG. 1 is a front elevational view of a modular operator station that is constructed in accordance with the present invention.
Figure 1A:
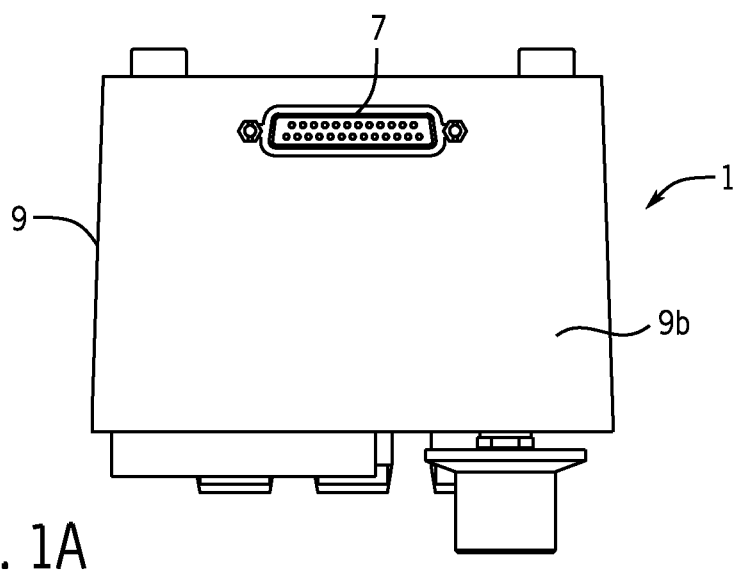
FIG. 1A is a top plan view of the modular operator station that is illustrated in FIG. 1.

As a preliminary matter, it should be noted that the system, assembly and method of the present invention is considered by these inventors to be novel in several regards. The designed aspects of the invention making it highly portable, uniformly storable, and easily accessible for student use; coupled with the aspects of the training modules to individually each purpose a singular technological function, and collectively to be combined with other modules to create integrated systems to purpose advanced technological functions, make this training system, assembly and method truly unique. Numerous specific details are set forth in the following description in order to provide a thorough understanding of the invention. There is however, also a need to provide such training systems in a wide variety of education disciplines. For example, the use of pre-designed modules would clearly be desirable in other engineering and technology training arts, particularly in the electro-mechanical arts. Such modules could also be applied in virtually any educational or training discipline where hardware, equipment, and equipment components would or could be used by students for training purposes.

The unique mechanical features of the system, assembly and method that is configured in the preferred embodiment are that all modules fit on the same sized mounting base. The base of each module comprises a flat planar structure having a top surface onto which a wide variety of components can be attached. Doing so facilitates use of the invention. Further, all mounting bases will have the ability to lay flat, to-be set up in a slightly inclined position, or be hung vertically, if necessary. All bases fit on wheeled carts for ease of use and mobility. The wheeled carts are designed and constructed to fit through standard size doorways and elevators, with some carts further comprising a working top surface and or further comprising means for hanging the mounting bases, for instructional purposes.

The unique electrical features of the system, assembly and method that is configured in the preferred embodiment are that all modules are designed to run on readily available 120 Volts AC. Further, any module that requires compressed air has its own integrated compressor on board. All modules are designed and constructed to purpose a single technological function, but are also designed and constructed to be combined with other modules as needed to create integrated systems to purpose advanced technological functions. Further, all modules are designed and constructed such that students have requirements of the associated curriculum to facilitate deliberate training outcomes for the learner. Each module uses components that would be easily and readily identifiable as components that the student is likely to encounter in the field. Because modules are designed to purpose a single technological function, replacing and/or upgrading technology on one module does not affect directly impact other modules.

Operationally, the modules are highly portable, uniformly storable, and easily accessible for student use. The modules can be placed as needed at workstations, and then returned to mobile storage carts. This feature allows targeted workspace to be used more efficiently as hardware is occupying only that portion of workstation space when and where students need it. This feature also allows standardized workspace to be utilized more fluidly on an "as-needed" basis as demand for each specific module in the system of trainers changes.

In the detailed description that follows, it is to be understood that the trainer modules discussed are presented for purposes of illustrating exemplary embodiments of the present invention. The embodiments are provided to illustrate aspects of the invention; however, the invention is not limited to the embodiments included. It is to be understood that the trainer modules could comprise a wide variety of different and other configurations to achieve other technical functionalities. The scope of the invention encompasses numerous alternatives, modifications, and equivalent; and is limited only by the claims. It is also to be understood that the components of any one or more of the modules are provided to "purpose" a single technical functionality. As used herein, the word "purpose" means to provide a given technical functionality as an operational goal.

Referring now to the drawings in detail, wherein like-numbered elements refer to like elements throughout, FIG. 1 illustrates a modular operator station 1 that comprises a housing 9. The station housing 9 comprises a face portion 9a having a plurality of selector switches 2, which are shown to be two-position selector switches but are not limited to such; a plurality of illuminated pushbuttons 3, which can be square lens type buttons in industry-standard colors of green, red and yellow, but are not limited to such; a plurality of indicator lights 4, which can be round lens type lights in industry-standard colors of green, red and yellow, but are not limited to such; a direct current, or DC, analog voltmeter 5;

and a potentiometer (not shown) having a dial 6. The station housing 9 further comprises a top portion 9b having a wire connector 7 having a terminal board (also not shown). It is to be understood that the precise configuration of the operator station 1 is not limited to that shown in FIG. 1. A number of different configurations could be used and such configurations are within the scope of the present invention.

Figure 2:
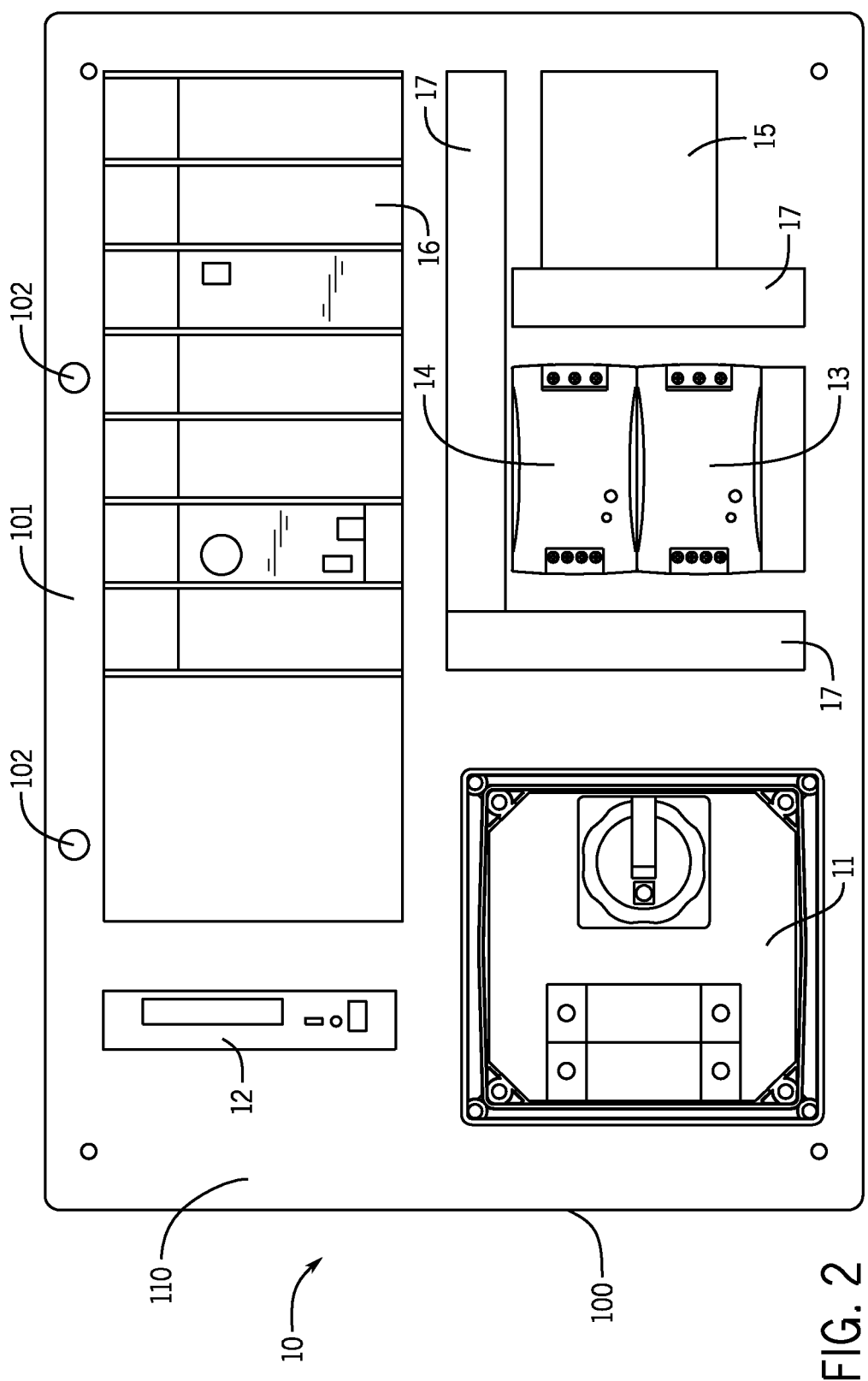
FIG. 2 is a first exemplary modular trainer that is constructed in accordance with the present invention and is configured as a PLC trainer.

Referring to FIG. 2, it illustrates a first exemplary modular trainer 10, which is a programmable logic controller, or "PLC," trainer that is constructed in accordance with the present invention to purpose the trainer 10 with PLC functionality. As shown, the PLC trainer 10 comprises a number of components that are mounted to a base, generally identified 100. Indeed, each training module that is configured in accordance with the present invention comprises a portable base 100 and the base 100 of each module is identically configured as a flat planar structure comprising a top surface or face 110. This "standardized" base 100 is one of the key features of the present invention. That is, each base 100 is like-dimensioned and configured for each of the trainer modules that will be discussed in this detailed disclosure.

As shown, the base 100 comprises apertures for attaching mounting feet (not shown) or other support structure (such as a tilting mechanism) to the back or bottom side of the base 100. Further, the base 100 comprises apertures 102 that are disposed along the top margin 101 of the base 100. These apertures 102 allow the relevant training module to be temporarily mounted to a movable cart such that the trainer is visible to students and instructors during training, as will be further apparent later in this detailed description.

Referring again the FIG. 2, it shows various components that are mounted to the top surface 110 of the base 100 of the PLC trainer 10. Those components comprise a 120 volt, alternating current, or AC, power disconnect box 11; a wireless access point 12, such as an Ethernet switch; a 24 volt DC power supply 13; a 12 volt DC power supply 14; an operator station connection box 15; a plurality of programmable and logic controllers with input and output interfaces 16 which are electrically connected to a plurality of input and output terminals; and a plurality of wire ways 17 for routing wires between the various components. The precise layout of the components for the PLC trainer is not limited to the way that the components are shown in FIG. 2 and such is not a limitation of the present invention.

Figure 3:
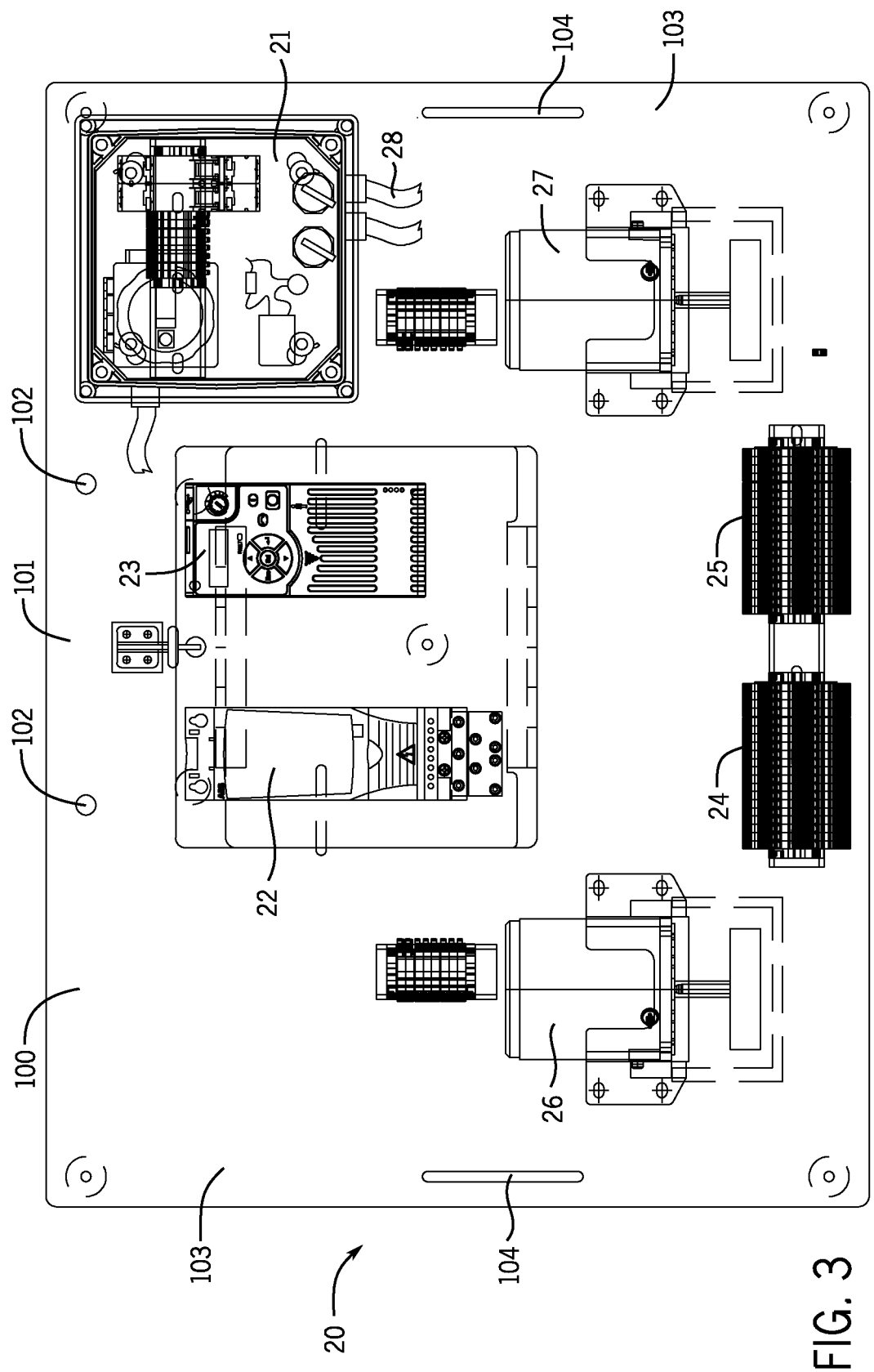
FIG. 3 is a top plan view of a second exemplary modular trainer that is constructed in accordance with the present invention and is configured as an AC drive trainer.

Referring to FIG. 3, it illustrates a second exemplary modular trainer 20, which is an AC drive trainer and the components of which are similarly mounted to the top surface 110 of the base 100 as described above. In this drawing, it will also be appreciated that opposing gripping handles 104 are mounted to the side margins 103 of the base 100. This is an optional feature of the modules that are configured in accordance with the present invention. To purpose the trainer 20 with AC drive functionality, the AC drive trainer 20 comprises a 120 volt AC power disconnect box 21; a pair of AC variable frequency drives 22, 23; a pair of operator station connection terminals 24, 25; and a pair of AC motors 26, 27. A number of conductors 28 (partially shown) are incorporated into this configuration. The precise layout of the components for the AC drive trainer 20 is not limited to the way that the components are shown in FIG. 3 and such is not a limitation of the present invention.

Figure 4:
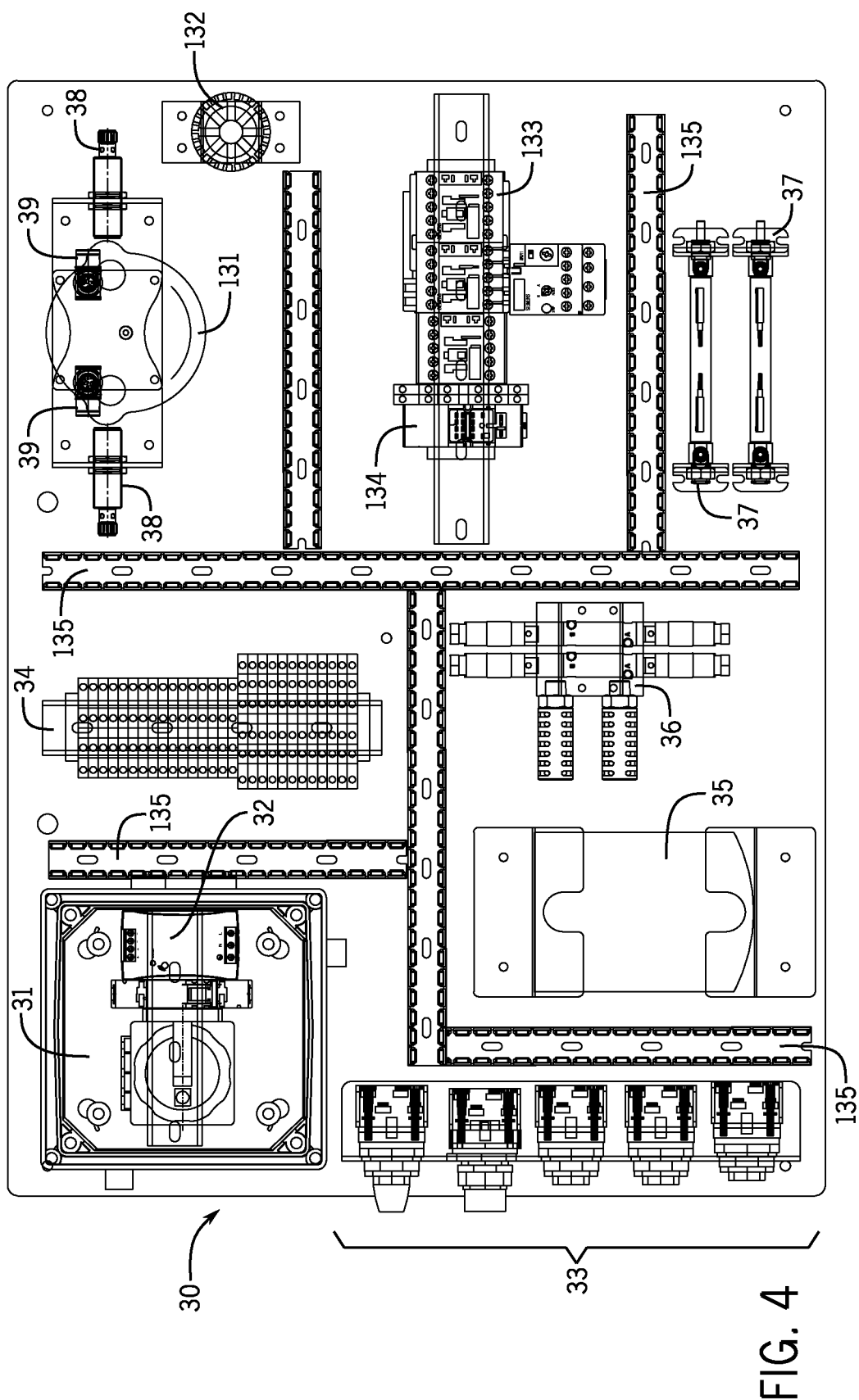
FIG. 4 is a top plan view of a third exemplary modular trainer that is constructed in accordance with the present invention and is configured as an automation trainer.

Referring to FIG. 4, it illustrates a third exemplary modular trainer 30, which is an automation trainer. To purpose the trainer 30 with automation functionality, the automation trainer 30 comprises a 120 volt AC power disconnect box 31 which has a clear cover; a 24 volt DC power supply 32; a plurality of indicator lights, switches and pushbuttons 33; a plurality of wiring terminals 34; an air compressor 35 coupled with a pair of pneumatic solenoid valves 36; and a pair of pneumatic cylinders with rod sensors 37. This trainer 30 also comprises proximity sensors 38; photoelectric sensors 39 together with a 24 volt DC gear motor 131 with a sensor target mounted to it. Lastly, the trainer 30 comprises a stack light 132; a three-phase reversing motor starter 133; a plurality of control relays 134; and a plurality of wire ways 135. This trainer 30 is configured to provide a multitude of functionalities for the student user in the area of automation. The precise layout of the components for the automation trainer 30, however, is not limited to the way that the components are shown in FIG. 4 and such is not a limitation of the present invention.

Figure 5:
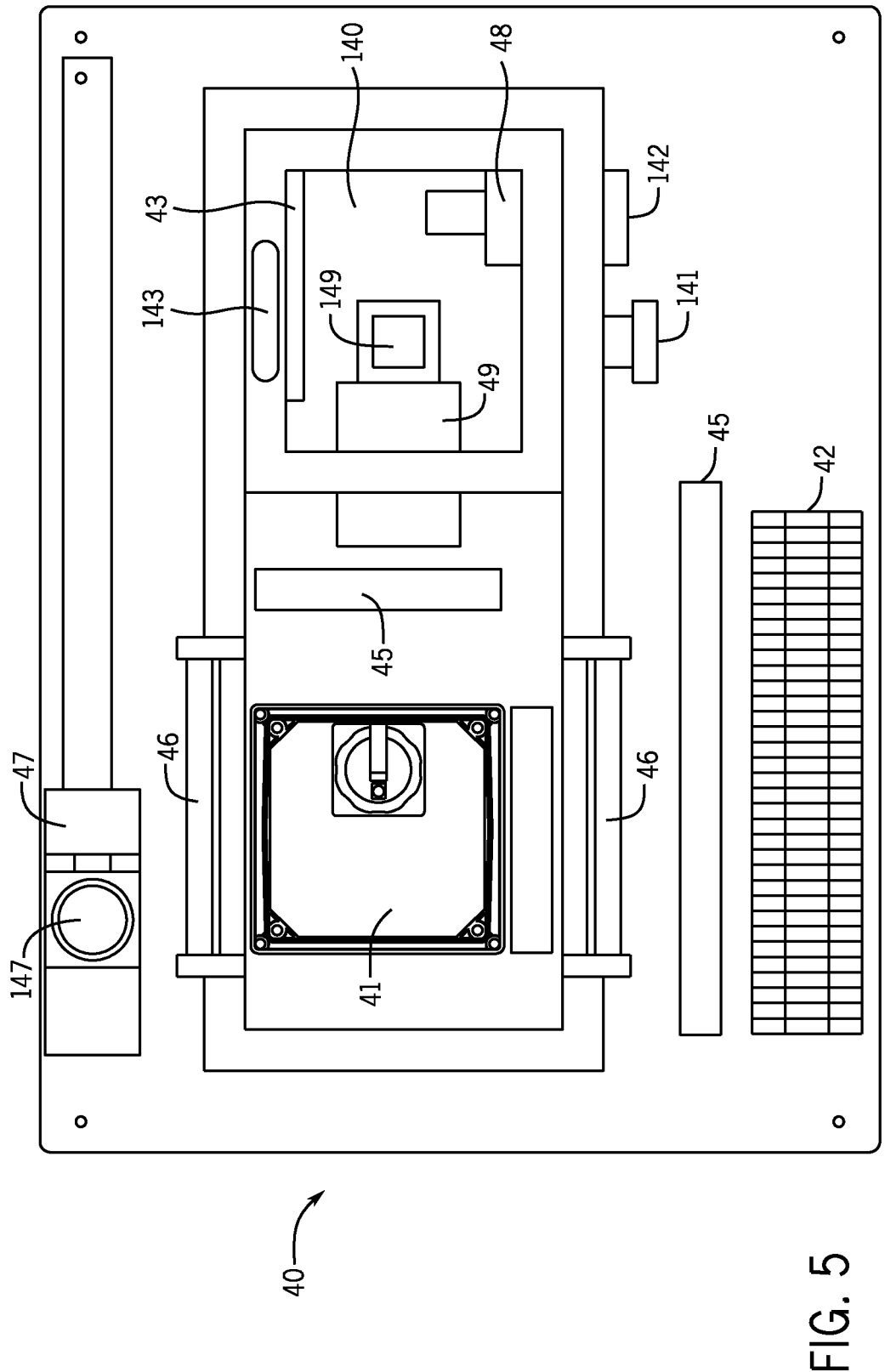
FIG. 5 is a top plan view of a fourth exemplary modular trainer that is constructed in accordance with the present invention and is configured as a safety device trainer.

Referring to FIG. 5, it illustrates a fourth exemplary modular trainer 40 that is constructed in accordance with the present invention. This trainer is a safety device 40 trainer and it comprises a number of components to purpose it with safety device functionality. It comprises a 120 volt AC power disconnect box 41; a terminal block 42; door switches 43; a pair of light curtain sensors 46; and a life line switch 47, the life line switch 47 comprising an actuation button 147. A compartment 140 having a see-through door and handle 143 is also provided. Within the compartment 140 is a motor 48 together with a safety controller 49 and a relay 149. An emergency stop push button 141 and a reset push button 142 are provided outside of the compartment 140. A plurality of wire ways 45 is also provided. The precise layout of the components for the safety device trainer 40, however, is not limited to the way that the components are shown in FIG. 5 and such is not a limitation of the present invention.

Figure 6:
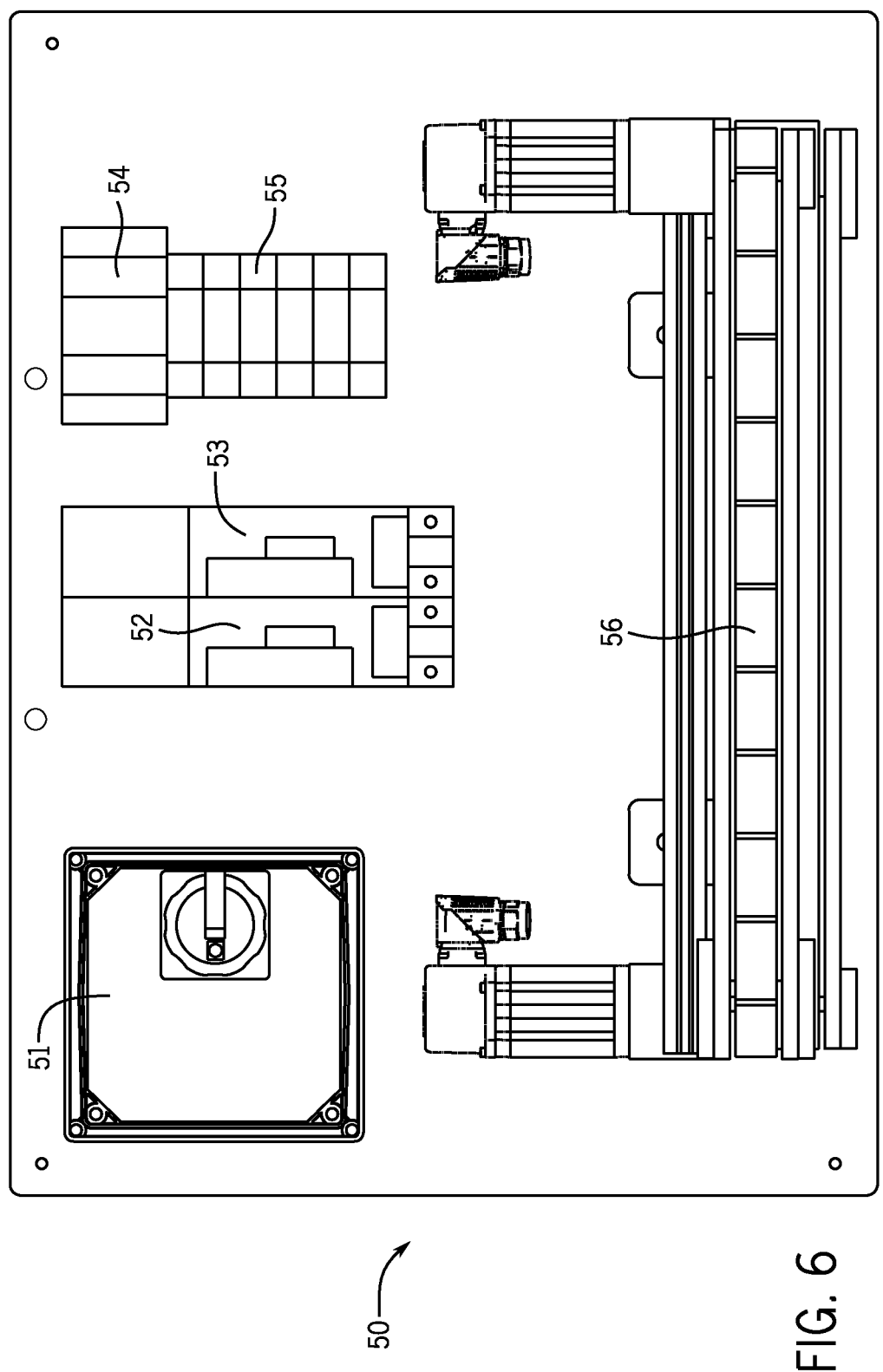
FIG. 6 is a top plan view of a fifth exemplary modular trainer that is constructed in accordance with the present invention and is configured as a servo trainer.
Figure 7:
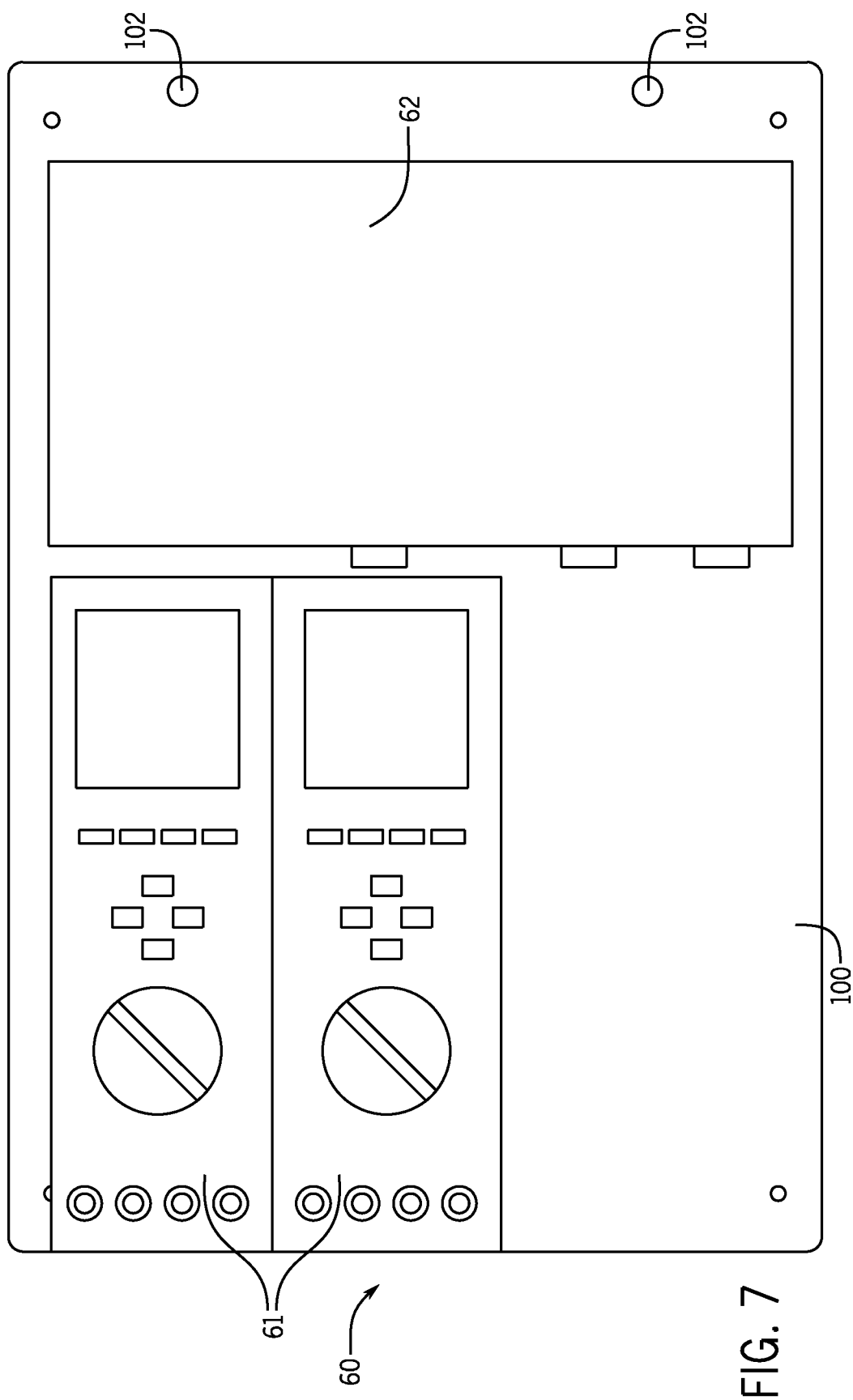
FIG. 7 is a top plan view of a sixth exemplary modular trainer that is constructed in accordance with the present invention and is configured as a metering board assembly and trainer.

Referring now to FIG. 6, it illustrates yet another exemplary modular trainer 50, which is a servo trainer. To purpose the trainer 50 with electromechanical servo functionality, the servo trainer 50 comprises a disconnect box 51; at least two servo drives 52, 53; a terminal strip 54; sensors 55; and a double stacked conveyer assembly 56. As with the other trainers, the precise layout of the components, as well as the number of components, for the servo trainer 50, however, is not limited to the way that the components are shown in FIG. 6 and such is not a limitation of the present invention. Lastly, FIG. 7 shows a metering board assembly 60 having a pair of multimeters 61 of conventional configuration mounted to the base 100, together with an oscilloscope 62. Again, the precise layout is not a limitation of the present invention. However, and unlike the other trainers discussed above, the apertures 102 defined within the base 100 are positioned to one side of the base 100 for practical use of the components mounted to that assembly 60.

As alluded to previously, the controller, metering assembly and training modules 10, 20, 30, 40, 50, 60 discussed above can be varied in layout, component detail and functionality, all of which is a feature of the present invention and not a limitation of the present invention. Further, a plurality of any one of the training modules may be used in any training setting.

Figure 8:
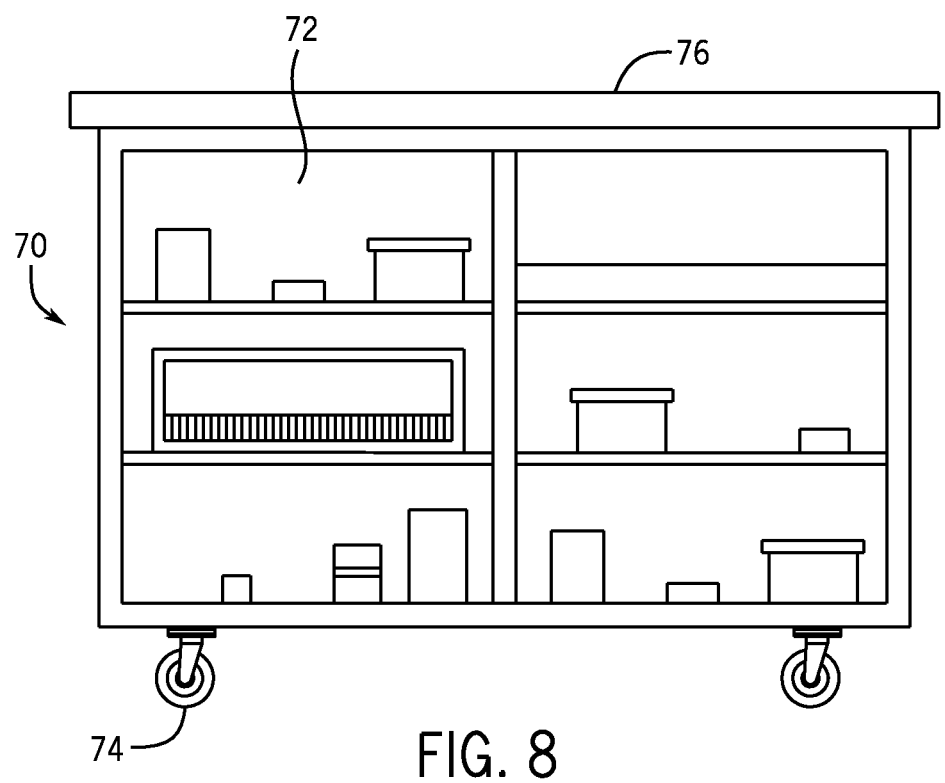
FIG. 8 is a side elevational view of a six trainer portable cart that is constructed in accordance with the present invention.
Figure 9:
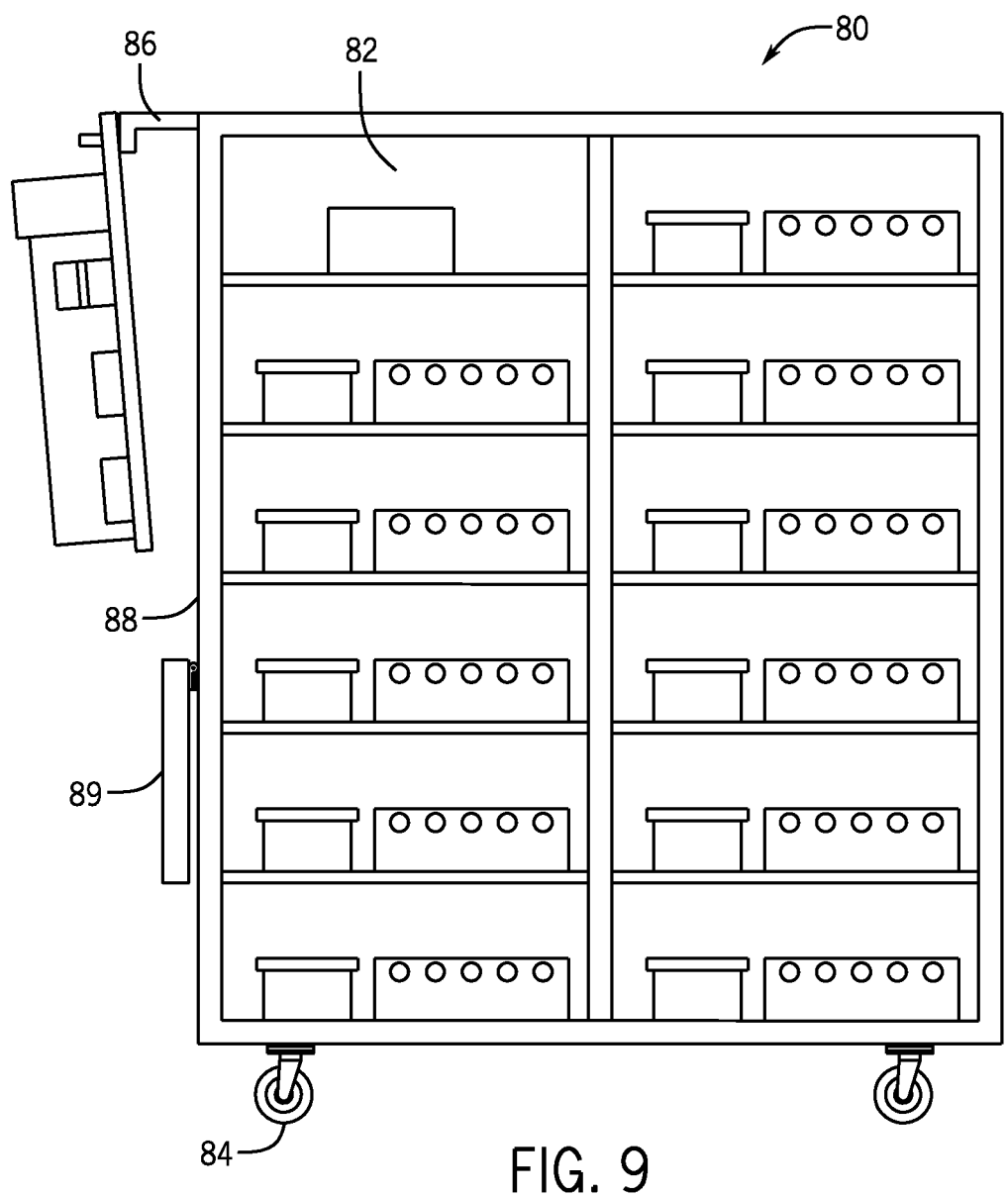
FIG. 9 is a side elevational view of a twelve trainer portable cart that is constructed in accordance with the present invention.

Another important feature of the present invention is that the controller, metering assembly and training modules 10, 20, 30, 40, 50, 60, or variations of such modules, are intended to be highly portable and interchangeable. To that end, each module comprises essentially the same physical "foot print" as the other modules, which is the reason that the common base 100 is used with each as described above. In this fashion, the modules can also be stored and moved on carts of the type shown in FIGS. 8 and 9. For example, FIG. 8 illustrates a cart 70 has enough compartments 72 to hold up to six (6) such modules. The cart 70 is wheeled 74 so as to make it easily movable and comprises a work surface 76 for the student user. FIG. 9 similarly illustrates a cart 80 that is configured with enough compartments 82 to hold up to twelve (12) modules. Although this cart 80 is a bit too tall to allow for a work surface to be integrated into the very top of the cart 80, it comprises a hinged worktop 88 that is integrated into the one side 88 of the cart 80. It also comprises a mounting fixture 86 which allows the module, in this case the automation trainer module 30, to be suspended along one side 88 of the cart 80 for instructional purposes. Again, this cart 80 is similarly wheeled 84 which allows the cart 80 to be easily moved as may be desired or required by the student user or the instructor.

As can be appreciated from the foregoing, it will be apparent that the metering assembly and all modules 10, 20, 30, 40, 50, 60 are configured to fit on the same size mounting panel, or base 100. In this way, all modules have the ability be hung vertically, if necessary, and to uniformly fit on carts 70, 80 for mobility. Further, both carts 70, 80 are designed to fit through standard size doorways and elevators. It is also to be understood that the carts built in accordance with the present invention could comprise other numbers of modules that can be placed within each cart. These inventors have found it most efficient, however, to use the six (6) module and twelve (12) modules carts as described above.

It will also be apparent that all modules 10, 20, 30, 40, 50, 60 are designed to run on readily available 120 volts AC. Further, any module that required lower voltage DC capability can be provided with that. Likewise, any module that needs compressed air has its own compressor on board. The goal of these inventors is to provide the system, assembly and method of the present invention whereby each module is designed with a single technological function, is designed to be combined with other modules as needed to create systems, and uses "real world" components of the type that a student will encounter following his or her training. It is also a goal that the system, assembly and method be designed such that student users have better access to the wiring of components on the modular trainers provided.

The modules are easily transported, individually and collectively, via the carts 70, 80 anywhere on campus or out to remote locations. This allows the modules to be placed as needed at work stations and then returned to storage carts, which allows work space to be used more efficiently as hardware is only occupying workstation space when student users need it. This also allows workspaces that are used for a specific module to increase during peak usage times and then be used for a different module during its peak usage time. Importantly, and because all modules are designed with a single technological function, replacing and/or upgrading technology on any one module does not affect all of the other modules. Further, and as technologies advance, the modules can be updated to include the latest embodiments of electrical, mechanical and electro-mechanical components.

The details of the invention having been disclosed in accordance with the foregoing, we claim:

1. A module assembly, comprising:
    a device, wherein the device further comprises:
        a base structure; and
        a top surface, wherein the top surface is a flat planar surface located at an upper portion of the base structure;
    an electrical source coupled to the base structure of the module, wherein the electrical source provides 120 V alternating current power to the housing; and
    a plurality of components, wherein:
        each component of the plurality of components is coupled to the device at the top surface;
        each component of the plurality of components is coupled to the electrical source such that the electrical source provides a scaled amount of power corresponding to the required power for the component to each component; and
        the plurality of components combine to purpose a particular technical function.

2. The module assembly of claim 1, further comprising a compressor coupled to the device, wherein the compressor provides compressed air to a component of the plurality of components.

3. The module assembly of claim 1, wherein each component of the plurality of components has access to wired connection points corresponding to a training outcome to be accomplished.

4. The module assembly of claim 1, wherein the particular technical function comprises one from a group consisting of:
    basic electricity;
    a programmable logic controller (PLC);
    an alternating current (AC) drive;
    an automation;
    a safety device; and
    servo control.

5. The module assembly of claim 1, further comprising a metering assembly, wherein the metering assembly comprises:
    a plurality of multimeters; and
    an oscilloscope.

6. The module assembly of claim 1, further comprising a station housing having a face portion, the face portion comprising:
    a plurality of selector switches;
    a plurality of pushbuttons;
    a plurality of indicator lights;
    a direct current (DC) voltmeter; and
    a potentiometer.

7. The module assembly of claim 1, wherein the plurality of components comprise:
    mechanical components;
    electrical components;
    electromechanical components; and
    electromagnetic components.

8. The module assembly of claim 1, wherein the plurality of components are standard components for the particular technical function purposed by the module assembly.

9. The module assembly of claim 8, wherein the standard components are International Electrotechnical Commission (IEC) Recognized components.

10. The module assembly of claim 1, wherein the base structure further comprises a plurality of apertures, the plurality of apertures to engage with a mounting fixture on a cart such that the module assembly is coupled to the cart at the plurality of apertures.

11. A module system, comprising:
    an external electrical source to provide a 120 volt alternating current power to the module system;
    a first module assembly, the first module assembly comprising:
        a device, wherein the device further comprises:
            a first base structure; and
            a first flat planar top surface located at an upper portion of the first base structure;
        a first electrical source, wherein:
            the first electrical source is coupled to and draws power from the external electrical source; and the first electrical source is coupled to the first base structure of the first module assembly;
a first plurality of components, wherein:
the first plurality of components combine to purpose a first technical function; and
the first plurality of components are coupled to the first electrical source; and
a first wired connection point; and
a second module assembly, the second module assembly comprising:
a device, wherein the device further comprises:
a second base structure; and
a second flat planar top surface located at an upper portion of the second base structure;
a second electrical source, wherein:
the second electrical source is coupled to and draws power from the external electrical source; and
the second electrical source is coupled to the second base structure of the second module assembly;
a second plurality of components, wherein:
the second plurality of components combine to purpose a second technical function; and
the second plurality of components are coupled to the second electrical source;
a second wired connection point, wherein:
the second wired connection point couples the second module assembly to the first module assembly at the first wired connection point; and
the first module assembly and the second module assembly purpose a first combined technical function when the second module assembly is coupled to the first module assembly, wherein the first combined technical function integrates the first technical function and the second technical function.

12. The module system of claim 11, wherein the first combined technical function is a technical function combining the first technical function of the first module assembly and the second technical function of the second module assembly.

13. The module system of claim 11, further comprising a third module assembly purposing a third technical function, wherein the third module assembly is coupled to the first module assembly and the second module assembly to purpose a second combined technical function.

14. The module system of claim 11, wherein the second combined technical function is a technical function combining the first combined technical function and the third technical function.

15. The module system of claim 11, wherein the particular technical function comprises at least one from a group consisting of:
basic electricity;
a programmable logic controller (PLC);
an alternating current (AC) drive;
an automation;
a safety device;
a servo control;
fluid power;
a metering board; and
an operating station.

16. The module system of claim 11, wherein the first base structure and the second base structure are identically sized.

17. The module system of claim 16, wherein the first base structure and the second base structure are standardized base structures.

18. The module system of claim 11, further comprising a cart having a plurality of compartments, wherein each compartment of the plurality of compartments is sized to receive a module assembly.

19. The module system of claim 18, wherein each compartment of the plurality of compartments is sized to receive a standardized base structure.

20. The module system of claim 18, wherein the cart further comprises a mounting fixture to receive and suspend a module.

* * * * *